United States Patent [19]

Nozue et al.

[11] 4,437,215
[45] Mar. 20, 1984

[54] THRUST BEARING WITH TAPERED LANDS

[75] Inventors: Shigehiro Nozue, Toyota; Tatsuhiko Fukuoka, Aichi; Hideaki Sugiura, Okazaki, all of Japan

[73] Assignee: Taiho Kogyo Co., Ltd., Aichi, Japan

[21] Appl. No.: 345,646

[22] Filed: Feb. 4, 1982

Related U.S. Application Data

[62] Division of Ser. No. 204,521, Nov. 6, 1980, Pat. No. 4,326,758.

[30] Foreign Application Priority Data

Dec. 25, 1979 [JP] Japan ................... 54-167602

[51] Int. Cl.³ .................................. B21D 53/10
[52] U.S. Cl. ........................ 29/149.5 R; 29/149.5 C; 29/148.4 L
[58] Field of Search ............. 29/149.5 R, 149.5 C, 29/148.4 L; 384/368; 308/170, 9, 160, DIG. 1, 240, 122, 73

[56] References Cited

U.S. PATENT DOCUMENTS

| 1,361,568 | 12/1920 | Donaldson | 29/149.5 R |
| 1,399,856 | 12/1921 | Fletcher | 29/149.5 R |
| 3,891,282 | 6/1975 | Tuffias | 308/170 |
| 4,007,974 | 2/1977 | Huber | 308/9 |
| 4,116,503 | 9/1978 | Licht | 308/160 |
| 4,277,112 | 7/1981 | Heshmat | 308/9 |
| 4,326,758 | 4/1982 | Nozue et al. | 384/368 |

Primary Examiner—Howard N. Goldberg
Assistant Examiner—V. K. Rising
Attorney, Agent, or Firm—Burgess, Ryan & Wayne

[57] ABSTRACT

A bored thrust bearing having a bearing face formed in series with tapered lands for forming a thrust load-carrying oil film, each tapered land being formed with a foot surface having a given sloping angle ($\beta$) and an upper surface having a gentle sloping angle ($\alpha$) less than the given sloping angle, the foot surface and the upper surface having therebetween a rounded boundary.

3 Claims, 15 Drawing Figures

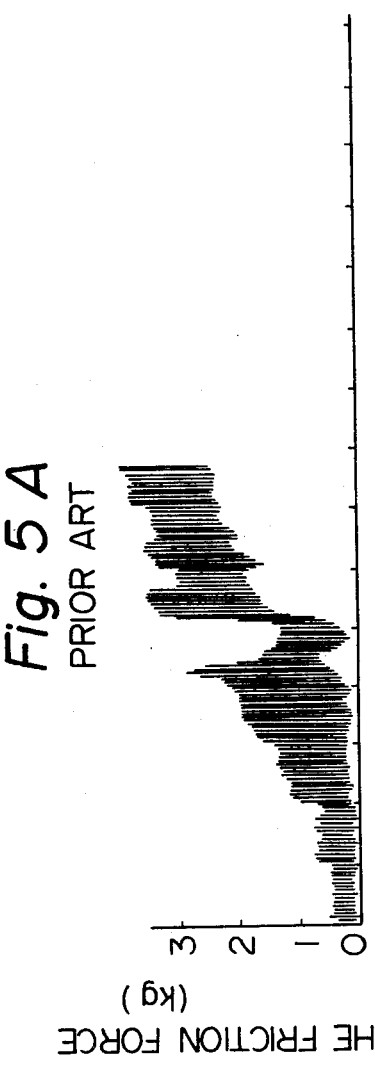
Fig. 5A PRIOR ART
Fig. 5B

THRUST BEARING WITH TAPERED LANDS

This is a division of application Ser. No. 204,521, filed Nov. 6, 1980, now U.S. Pat. No. 4,326,758.

FIELD OF THE INVENTION

The present invention relates generally to a thrust bearing, and more particularly, relates to a thrust bearing of the type in which a bearing face is formed with tapered lands and to a method of producing the thrust bearing.

BACKGROUND OF THE INVENTION

A thrust bearing having a bearing face with tapered lands is conventionally used for supporting thrust loads applied to the bearing face by means of a rotating shaft engaging the bearing face. The conventional thrust bearing of this type is made of a copper-type metal material containing lead or tin or an aluminum-type metal material containing tin, and is conventionally produced from a strip of the above-mentioned metal material by the employment of the press working method. As illustrated in FIGS. 1A and 1B, the conventional thrust bearing of this type has at its center a hole 1 through which will penetrate a rotating shaft with a shoulder, a bearing face 2 which is formed around the hole 1 to carry a thrust load, and a back face 3 which is formed on the opposite side of the bearing face 2. The conventional thrust bearing also has a plurality of tapered lands 4 formed in series in the bearing face 2 along the circumferential direction. The tapered lands 4 are shaped so that a wedge-shaped oil film is formed between the bearing face 2 and the surface of the shoulder of the rotating shaft. The tapered lands 4 are formed by the stamping method employing a stamping mold during the punching step by a press machine, and subsequently subjected to the well known tufftriding treatment for hardening the entire surfaces of the tapered lands 4. The tapered lands 4 are then subjected to buffing so that coarse surface of the tapered lands 4 are polished to a fine mirror surface. The tops of the tapered lands 4 are slightly rounded by the above-mentioned buffing step, although the general configuration of sharp edges of the tapered lands 4 still remain. According to such a conventional thrust bearing with tapered lands, the height of each tapered land 4 is usually from 5 to 10 microns. It is therefore difficult to form all of the tapered lands 4 maintaining the same height. Accordingly, the thrust load carried by the bearing face 2 of the thrust bearing is inevitably concentrated onto the tapered land 4 having the greatest height. Consequently, the oil film is broken on the highest tapered land 4 on which is concentrated the thrust load. Thus, so-called metal contact occurs between the highest land 4 and the rotating shaft while resulting in the occurrence of abnormal wear and seizure due to high friction heat. Moreover, such an unstable factor is presented that the frictional torque changes depending upon a change in the thrust load.

In order to eliminate the above-mentioned defects, it has been proposed to flatten the tops of tapered lands 4 by the method of polishing so that each tapered land 4 has an equal height. That is to say, one improvement over the conventional thrust bearing with tapered lands 4 has been proposed in which flat lands 5 are formed in the portions of the tapered lands 4 as shown in FIG. 2. According to the structure of tapered lands 4 having flat lands 5 as shown in FIG. 2, however, the circumferential length of the angled surface 6 for forming the wedge-shaped oil film is shortened. As a result, the surface area for carrying the thrust load is reduced. Consequently, the oil film pressure is increased for a given thrust load which will act on the oil film by means of the rotating shaft, so that the thickness of the oil film is inevitably reduced regardless of an increase in the allowable load. Accordingly, there easily takes place metal contact between the tapered lands 4 and the surface of the rotating shaft. Particularly, the thickness of the oil film is reduced to a boundary 7 between the angled surface 6 and the surface of the flat land 5, presenting the probability that the friction heat is generated at the boundary 7, which gives rise in the occurrence of seizure.

SUMMARY OF THE INVENTION

It is therefore an object of the present invention to provide a novel thrust bearing with tapered lands, which is free from the above-mentioned defects encountered by the conventional thrust bearings with tapered lands.

It is another object of the present invention to provide a method of producing the novel thrust bearing with tapered lands.

According to one aspect of the present invention, there is provided a thrust bearing having a central bore for receiving therein a rotating shaft, a bearing face extending around the central bore for making a sliding engagement with a sliding part of the shaft, and tapered lands circumferentially arranged in series in the bearing face for forming a thrust load-carrying oil film of a wedge shape between the tapered lands and the slide part of the shaft, wherein each of said tapered lands is formed with a foot surface having a given sloping angle ($\beta$) and an upper surface having a gentle sloping angle ($\alpha$) less than said given sloping angle of said foot surface, said foot surface and said upper surface having therebetween a rounded boundary.

According to another aspect of the present invention, there is provided a method of producing a thrust bearing having tapered lands formed in a bearing face of the bearing, comprising the steps of:

punching a half-completed part from a metallic plate material by a press working, said half-completed bearing part having, on both sides thereof, annular bearing faces extending around a central bore for receiving therein a rotating shaft, said half-completed bearing part further having a plurality of said tapered lands disposed in at least either one of said annular bearing faces; applying a hardening treatment to said bearing faces for hardening surfaces of said tapered lands; lapping under portions of said tapered lands for forming, in said upper portions, flat planes lying on an equal plane; and buffing said tapered lands having flat planes toward a predetermined circumferential direction so that said flat planes are gently angled and all acute angle corners of said tapered lands are rounded.

The present invention will be better understood from the ensuing description of a preferred embodiment with reference to the accompanying drawings wherein:

FIGS. 5A and 5B are graphical representations illustrating comparative test results of friction torques between the conventional thrust bearing and the bearing of the present invention;

Figure 2:
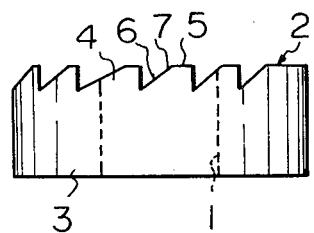
FIG. 2 is a side view illustrating another conventional thrust bearing with tapered lands.
Figure 3A:
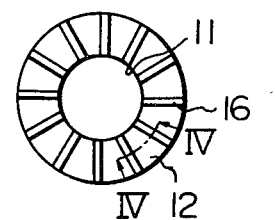
FIGS. 3A and 3B are a plan view and a side view illustrating a thrust bearing with tapered lands, according to an embodiment of the present invention.
Figure 3B:
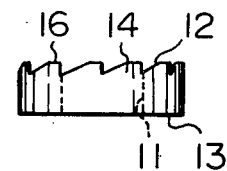
Figure 4:
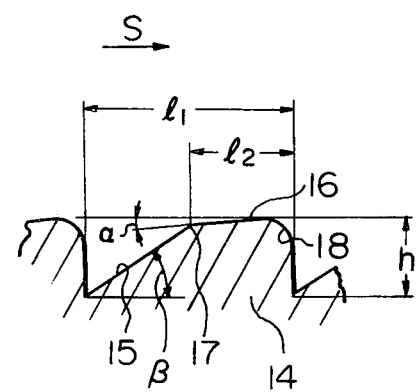
FIG. 4 is a partial enlarged view of a portion of the thrust bearing of FIG. 3.
Figure 6:
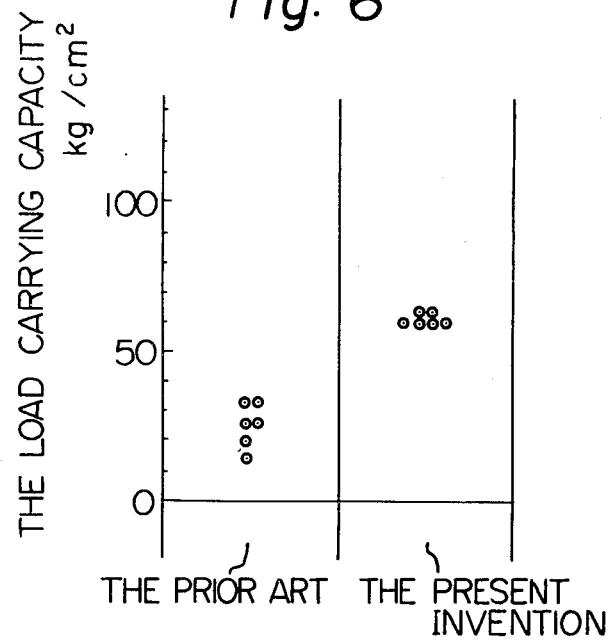
FIG. 6 is a graphical representation illustrating comparative test results of a load carrying capacity between the conventional thrust bearing and the thrust bearing of the present invention.

Referring now to FIGS. 3A, 3B and 4, the thrust bearing of the present invention is formed generally in the shape of a ring having a central bore 11 through which a rotating shaft with a shoulder (not shown) is inserted. The thrust bearing has, around the bore 11, a bearing face 12 against which the shoulder of the thrust bearing bears, and a back face 13 on the opposite side of the bearing face 12. Tapered lands 14 of a particular configuration which will be later described are formed in the bearing face 12, so that the thrust bearing exhibits a considerably large load carrying capacity, low friction, much resistance against seizure and a stable friction torque irrespective of the change in the thrust load acting on the bearing face 12. The tapered lands are formed in a plurality of numbers in series along a predetermined circumferential direction of the bearing face 12. As illustrated in FIG. 4, each tapered land 14 is formed with a foot surface 15 and an upper surface 16 which is continuous from the foot surface 15. The foot surface 15 has a given sloping angle $\beta$ with respect to a plane perpendicular to the center line of the thrust bearing. The foot surface 15 ascends in the direction corresponding to the rotating direction S of the shaft which is inserted in the bore 11 of the thrust bearing. The sloping angle $\beta$ is nearly constant for all of the tapered lands 14, and is selected to lie within a range of $0 < \beta < 90°$ depending upon the maximum magnitude of a thrust load which is exerted by means of the rotating shaft. The upper surface 16, on the other hand, has a less sloping angle $\alpha$ with respect to a plane perpendicular to the center line of the thrust bearing. Further, the length $l_2$ of the upper surface 16 in the direction S has a relation $0 < l_2/l_1 < 0.6$ with respect to the whole length $l_1$ of the tapered land 14 in the direction S. The angle $\alpha$ and the angle $\beta$ should preferably establish a relation $0 < \alpha < \beta < 5°$. Furthermore, the boundary 17 between the foot surface 15 and the upper surface 16 is rounded so as to have a radius of about 40 to 50 microns, and the end corner 18 of the tapered land 14 is rounded so as to have a radius of 5 to 10 microns. The total height h of the tapered land 14 is selected so as to range from approximately 4 to 6 microns. According to the present invention, since the upper surface 16 of a gently sloping angle is formed on the upper side of the foot surface 15 in the tapered land 14, as described above, it is possible not only to prevent the breakage of the oil film that is caused by unequal height of the conventional tapered lands 4 shown in FIGS. 1A and 1B but also to promote the formation of the wedge-shaped oil films on both of the foot and upper surfaces 15 and 16. Accordingly, it is possible to avoid the metal contact between the thrust bearing and the rotating shaft that develops when the thickness of the oil film is reduced as in the case of the tapered lands 4 having the flat lands 5 shown in FIG. 2. Since the boundary 17 between the foot and upper surfaces 15 and 16, and the end corner 18 are rounded, it is possible to avoid the oil film from being broken when the thrust load is concentrated on the boundary 17 and the end corner 18. Furthermore, the provision of the upper surface 16 of gently sloping angle makes it possible to increase the peak value of the oil film pressure compared with that of the conventional tapered lands 4 shown in FIGS. 1A and 1B. Therefore, the thrust load carrying capacity of the thrust bearing of the present invention can be higher than that of the conventional thrust bearing with tapered lands. Experimental tests conducted by the present inventors have proved the enhanced performance of the thrust bearing of the present invention compared with the conventional thrust bearing. FIGS. 5 and 6 illustrate the experimental test results.

(I) Test of Friction Torque

Figure 1A:
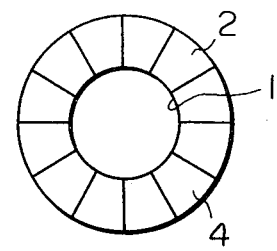
FIGS. 1A and 1B are a plan view and a side view illustrating the structure of a conventional thrust bearing with tapered lands, respectively.
Figure 1B:
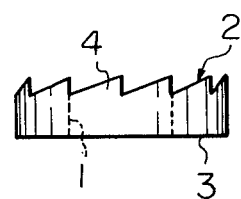

FIGS. 5A and 5B illustrate the test results of friction torques tested with the conventional thrust bearing having tapered lands 4 of the shape as shown in FIGS. 1A and 1B and with the thrust bearing of the present invention having tapered lands 14 of the shape as shown in FIGS. 3A, 3B and 4 under the following test conditions. FIG. 5A illustrates the test results of the conventional thrust bearing, and FIG. 5B illustrates the test results of the thrust bearing of the present invention.

Test Conditions

| | |
|---|---|
| The oil used in the experimental test | ATF (automatic transmission oil) |
| The Loading method | A thrust load is gradually increased (10 kg/minute) |
| The amount of oil | 100 milliliters |
| The running speed of a rotating shaft | 1850 R.P.M. (The peripheral speed of 2.2 meters/second) |
| The lubricating method | The immersing method |

It is understood from the comparison of the experimental test results shown in FIG. 5A and FIG. 5B that the thrust bearing of the present invention exhibits relatively small friction torques over a wide range of thrust loads.

(II) Test of the Resistance against Seizure

The test was conducted under the same conditions as those in Test (I), above, and by employing the conventional and inventional thrust bearings similar to those employed in test (I), above. During the test, the values of the thrust loads were measured at the moment when the thrust bearings were seized up under the same testing conditions as those of the Test (I) on the friction torque. The test results are shown in FIG. 6. It is understood that any of the tested conventional thrust bearings is seized up under the thrust load of 15 through 35 kg/cm², where all of the tested thrust bearings of the present invention are seized up under the thrust load of greater than 60 kg/cm² which is approximately twice of that of the conventional thrust bearings.

Figure 7:
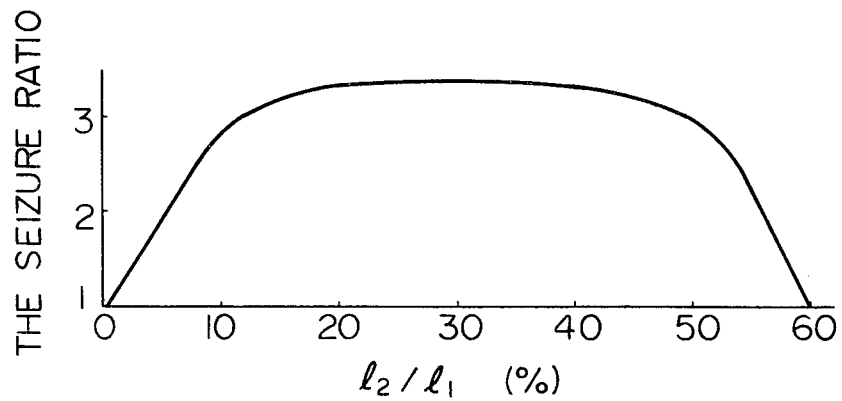
FIG. 7 is a graphical representation illustrating a theoretical basis for determining the length of the gently angled surface of each tapered land of the thrust bearing of the present invention.

FIG. 7 is a graphical representation illustrating the reason why the relation between the length $l_1$ of the tapered land 14 and the length $l_2$ of the gently angled surface 16 is chosen so as to be $0<l_2/l_1<0.6$ in the thrust bearing of the present invention. That is, the abscissa of FIG. 7 indicates the value of $l_2/l_1$, while the ordinate of FIG. 7 indicates the ratio between one unit thrust load at which seizure develops in the conventional thrust bearing as shown in FIGS. 1A and 1B and diverse thrust loads at which seizure develops when various lengths $l_2$ are adopted for the tapered land 14 of the thrust bearing of the present invention. Therefore, a seizure ratio 3 of the ordinate indicates that the seizure develops for the first time when the thrust load corresponding to three times the above-mentioned unit thrust load is exerted on the thrust bearing of the present invention.

Figure 8:
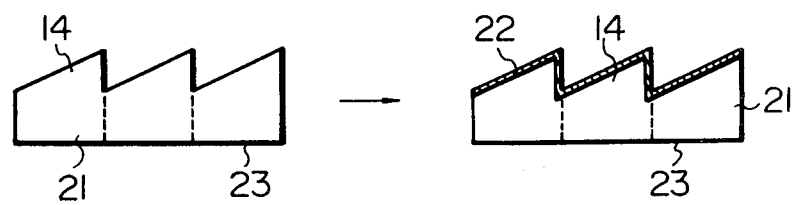
FIG. 8 is a side view of a half-completed part of the thrust bearing with tapered lands, according to the present invention.

The method of producing the thrust bearing according to the present invention will now be described with reference to FIGS. 8 and 9.

The thrust bearing according to the present invention is initially produced by punching a metal sheet, such as a cold rolled carbon steel sheet of a predetermined thickness (for example, three millimeters) into a part having the shape of a washer. Subsequently, on one face of the washer-shaped part, the tapered lands 14 are stamped by using a pressing mold. Consequently, as a half-completed product, a bearing part 21 is formed as shown in FIG. 8. The tapered lands 14, at this stage, have a height of approximately ten microns. Thereafter, the surface of the tapered lands 14 is subjected to the tufftriding or soft nitriding treatment so that a hardened layer 22 in the tapered land 14 is formed. The upper skin of the hardened layer 22 is removed by using a coarse polishing paper until the height of all tapered lands 14 is approximately uniform. At a subsequent step, the back face 23 on the side opposite to the tapered lands 14 of the bearing part 21 is polished by a grinder, so that top edges of all tapered lands 14 lie on a common flat plane parallel with the back face 23. At this stage, it should be understood that the hardened layer 22 may consist of a hard chromium layer plated onto the surface of the tapered lands 14. If hard chromium plating is employed, no step for removing the upper skin of the above-mentioned tufftriding treatment layer 22 is necessary. The hard chromium can be plated on the cold rolled carbon steel material in a Sargent bath containing chromic acid and sulfuric acid under the conditions of a temperature of 45 degrees centigrade, a current density of 20 amp./cm$^2$ and an electric voltage of 4.5 volts. In this case, the hard chromium can be plated to a thickness of 20 microns having a hardness of 830 microvickers at a current efficiency of 13 percent. Subsequently, the upper portion of the angled surface of the tapered lands 14 is subjected to a lapping step by using a lapping machine or fine polishing paper, so that the upper portion of the angled surface is flattened. As a result, the height of the tapered lands 14 becomes seven through eight microns. Thus, flattened tapered lands 14 are then subjected to the buffing step, so that the flattened portions are gently angled, the boundary between the angled surfaces and the upper gently angled portions as well as all edges are rounded, and so that the entire surfaces of the tapered lands are finished to a mirror plane. The finished tapered lands 14 have the height of approximately four through six microns. In performing the buffing step, a rotary plate lined with a felt material is preferably used. However, a rotary buffing device made by a laminating a number of leather pieces, felt pieces, rubber pieces, cloth pieces or paper pieces may be used for performing the above-mentioned buffing step. Further, in place of the buffing method, a barrel polishing method, a liquid honing method by the injection of a liquid, an electrolytic polishing method, a chemical polishing method, or the combination of these methods may be employed.

Figure 9:
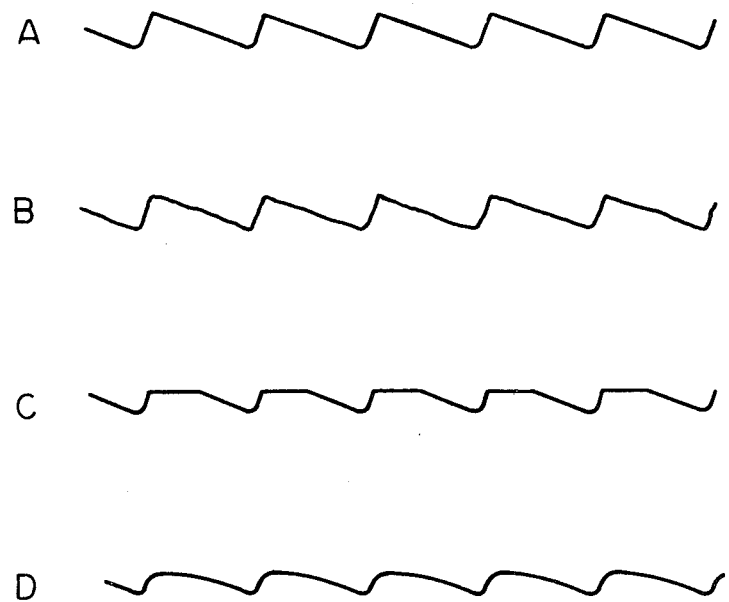
FIG. 9A-9D is a diagrammatic representation illustrating a change in the shapes of the tapered lands of the thrust bearing of the present invention during the production steps of the bearing.

Diagrams A, B, C, and D of FIG. 9 illustrate the change in the production state of the tapered lands while the production of the thrust bearing is gradually advanced according to the method of the present invention. The diagram A illustrates the initial state in which the stamping of the tapered lands 14 by the use of a press mold is just completed, the diagram B illustrates the subsequent state in which application of the tufftriding treatment to the surfaces of the tapered lands is completed, the diagram C illustrates a further state in formation of a gently angled surface of the upper portion of each tapered land by the use of a lapping or polishing paper is completed, and the diagram D illustrates the final state in which application of the buffing process to the entire surface of the tapered lands is completed.

From the foregoing description of the embodiment of the present invention, it will be understood that since the tapered lands of the thrust bearing of the present invention, have a foot surface having a given sloping angle and an upper surface having a gently sloping angle less than the given sloping angle of the foot surface, a wedge-shaped oil film is formed between both the foot and upper surfaces of the tapered lands and the sliding surface of a rotating shaft, so that the thrust load carrying capacity is extreamly high. Further, since the boundary between the foot and upper surfaces of the tapered lands as well as the end corners of the tapered lands are rounded, the oil film is prevented from being broken, so that occurrence of metal contact between the thrust bearing and the sliding surface of the rotating shaft is avoided. Therefore, resistance against seizure is considerably increased compared with the conventional thrust bearing. Further, frictional torque of the thrust bearing of the present invention can be appreciably low and stabilized compared with the conventionally made thrust bearing.

We claim:

1. A method of producing a thrust bearing having tapered lands formed in a bearing face of said bearing, comprising the steps of:
    punching a half-completed bearing part from a metallic plate material by a press working, said half-completed bearing part having, on both sides thereof, annular bearing faces extending around a central bore for receiving therein a rotating shaft, said half-completed bearing part further having a plurality of said tapered lands disposed in at least either one of said annular bearing faces;
    applying a hardening treatment to said bearing faces for hardening surfaces of said tapered lands;
    lapping upper portions of said tapered lands for forming, in said upper portions, flat planes lying on an equal plane; and
    buffing said tapered lands having flat planes toward a predetermined circumferential direction so that said flat planes are gently angled and all acute angle corners of said tapered lands are rounded.

2. A method according to claim 1, wherein said metal plate material is a cold rolled carbon steel plate.

3. A method according to claim 2, wherein said hardening treatment is a tufftriding treatment.

* * * * *